No. 781,024. PATENTED JAN. 31, 1905.
T. ROOS.
METHOD OF MANUFACTURING HAIR PINS OR THE LIKE.
APPLICATION FILED NOV. 19, 1904.
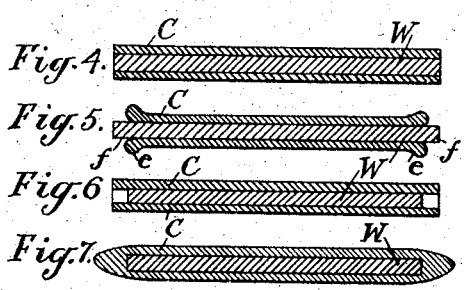
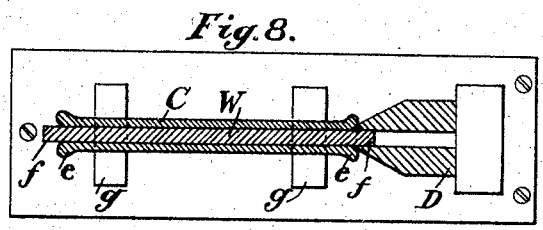
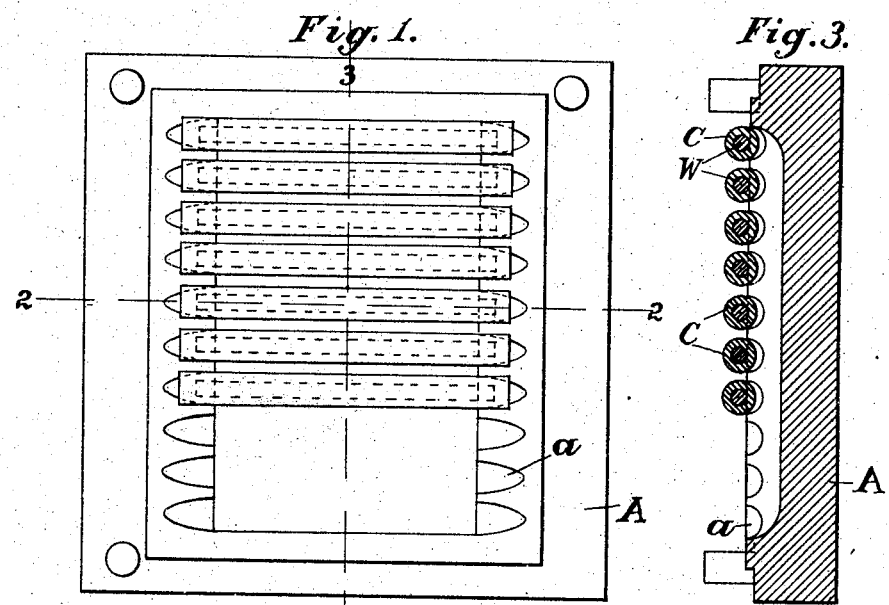
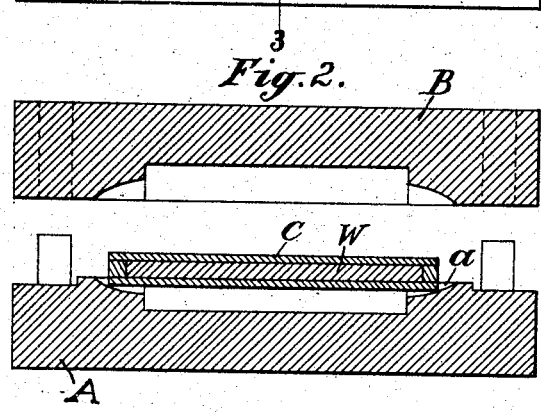
Witnesses
Geo. W. Eisenbraun
Raena H. Yudizky
Theophilus Roos Inventor
By His Attorney Fred'k P. Schuetz No. 781,024. Patented January 31, 1905.

UNITED STATES PATENT OFFICE.

THEOPHILUS ROOS, OF NEWARK, NEW JERSEY.

METHOD OF MANUFACTURING HAIR-PINS OR THE LIKE.

SPECIFICATION forming part of Letters Patent No. 781,024, dated January 31, 1905.

Application filed November 19, 1904. Serial No. 233,527.

*To all whom it may concern:*

Be it known that I, THEOPHILUS ROOS, a citizen of the United States of America, residing at Newark, in the county of Essex and State of New Jersey, have invented certain new and useful Improvements in Methods of Manufacturing Hair-Pins or the Like, of which the following is a specification.

My invention has reference to improvements in the manufacture of hair-pins and the like which are composed of a material becoming plastic under the application of heat and which are reinforced by a metallic core adapted to give strength to the pin or like article.

To this end my invention consists, essentially, in cutting suitable lengths from a wire covered with the moldable material, such as celluloid, then heating the ends of these lengths to soften the material, then pushing the plastic material back a short distance at the ends and clipping the projecting wires, again heating the ends to allow the plastic material to assume its original shape, dipping into cement to fill or seal the ends, and finally pointing said ends.

The nature of my invention will best be understood when described in connection with the accompanying drawings, in which—

Figure 1 is a top view of a die, showing some of the lengths in place. Fig. 2 is a section on the line 2 2, Fig. 1. Fig. 3 is a section on the line 3 3, Fig. 1. Figs. 4 to 7 are sections of the lengths at various stages of manufacture. Fig. 8 is a plan and part section of the device used to upset the material at the ends of the lengths.

Similar letters of reference designate corresponding parts throughout the several views.

For the sake of clearness the lengths are shown considerably out of proportion.

Referring now to Figs. 4 to 8, W designates a resilient wire of the proper strength and about which has been forced a material C, such as celluloid, becoming plastic under the application of heat. I make the hair-pins or like articles from this wire by cutting it into suitable lengths, as shown in Fig. 4. The ends of these lengths are then heated, preferably by dipping them into water at or near the boiling-point to soften the material. The wire is then placed in supports $g$, Fig. 8, and the ends pressed against the tubular device D until a sufficient amount of the wire W projects, thereby upsetting the plastic material C, so that it assumes a shape about such as $e$, Figs. 5 and 8. The projecting ends $f$ of the wire W are then clipped off and the ends of the lengths again heated by dipping into hot water, when the celluloid reassumes the tubular form, as shown in Fig. 6, or may be made so assume such form by passing the ends of the lengths through the fingers. The ends are then sealed by dipping into celluloid cement and are now ready to be pointed. For this purpose a number of these lengths are placed in grooves $a$, Figs. 1 to 3, of the die A. These grooves are tapered and project slightly beyond the ends of the prepared lengths. A series of these prepared lengths having been placed in their respective grooves, the upper die B, having grooves similar to the grooves $a$ of the die A, is placed upon the die A and the whole heated and subjected to pressure in a hydraulic press or other suitable means, then allowed to cool in the die or removed to a hand-press, and cooled. After cooling the lengths are removed and then have the form as shown in Fig. 7, both ends being pointed. The slight barb caused by the compression is removed by grinding or otherwise, and the finished pieces are then bent to the desired form.

What I claim as my invention, and desire to secure by Letters Patent, is—

1. The method of forming hair-pins or the like from wire covered with celluloid, which method consists in cutting the wire into proper lengths, upsetting the celluloid at the ends, clipping off the projecting ends of the wire and pointing the ends from the upset celluloid.

2. The herein-described method for the manufacture of hair-pins and the like consisting in heating the ends of suitable lengths of wire covered with a material, celluloid, which becomes plastic under the application of heat, forcing back a portion of said plastic material, then clipping the projecting ends of the wire and again heating the ends of the lengths, sealing said ends with a cement, and finally pointing the ends.

3. The herein-described method for the manufacture of hair-pins and the like consisting in heating the ends of suitable lengths of wire covered with a material, celluloid, which becomes plastic under the application of heat, forcing back a portion of said plastic material, then clipping the projecting ends of the wire and again heating the ends of the lengths, sealing them with a cement, and finally compressing these lengths in a die so as to point the ends thereof.

In testimony whereof I have signed my name to this specification, in the presence of two subscribing witnesses, this 17th day of November, 1904.

THEOPHILUS ROOS.

Witnesses:
A. FABER DU FAUR,
AGNES GRAY.